United States Patent [19]
Thomas et al.

[11] Patent Number: 5,378,494
[45] Date of Patent: Jan. 3, 1995

[54] METHOD OF APPLYING A THIN COATING ON THE LOWER SURFACE OF A BILEVEL SUBSTRATE

[75] Inventors: Patrick A. Thomas, Maplewood; Robert P. Wenz, Woodbury, both of Minn.

[73] Assignee: Minnesota Mining and Manufacturing Company, St. Paul, Minn.

[21] Appl. No.: 198,895

[22] Filed: Feb. 18, 1994

[51] Int. Cl.⁶ .............................................. B05D 5/12
[52] U.S. Cl. .................................... 427/58; 427/358; 427/372.2; 427/384
[58] Field of Search ...................... 428/1; 427/58, 358, 427/372.2, 384

[56] References Cited
U.S. PATENT DOCUMENTS

| | | | |
|---|---|---|---|
| 1,494,630 | 6/1923 | Reizenstein | 427/277 |
| 3,941,901 | 3/1976 | Harsch | 427/358 |
| 4,235,525 | 11/1980 | Berman et al. | 350/339 |
| 4,261,650 | 4/1981 | Sprokel | 350/341 |
| 5,077,157 | 12/1991 | DiSanto et al. | 428/1 |
| 5,106,441 | 4/1992 | Brosig et al. | 428/1 |
| 5,128,788 | 7/1992 | Takatoh et al. | 428/1 |
| 5,268,782 | 12/1993 | Wenz et al. | 359/81 |

*Primary Examiner*—Shrive Beck
*Assistant Examiner*—Benjamin L. Utech
*Attorney, Agent, or Firm*—Gary L. Griswold; Walter N. Kirn; Eric D. Levinson

[57] ABSTRACT

A method of applying a thin coating to the lower surface of a bilevel substrate includes the following steps: A liquid coating, such as a material useful as an alignment layer, is applied over a bilevel substrate, such as an LCD panel. The bilevel substrate may have flat-topped ribs or other protrusions so long as the tops of the protrusions are coplanar. Next, a leveling device, such as a doctor blade, is moved across the upper surface of the bilevel substrate so that the liquid coating is removed from the upper surface but remains on the lower surface. Finally, the liquid coating is hardened and shrunk, e.g., by drying or curing, resulting in a highly uniform hardened coating, such as an alignment layer, on the lower surface of the bilevel substrate.

14 Claims, 1 Drawing Sheet

METHOD OF APPLYING A THIN COATING ON THE LOWER SURFACE OF A BILEVEL SUBSTRATE

FIELD OF THE INVENTION

The present invention relates generally to methods of applying coatings to bilevel substrates, particularly between the ribs of a microribbed substrate, and more specifically to applying an alignment layer in a liquid crystal display.

BACKGROUND OF THE INVENTION

Known methods of depositing a coating on a substrate include die coating, knife-edge or notched-bar coating, spin coating, spray coating, gravure roll coating, and screen printing. Conventional die coating techniques are applicable only for wet thicknesses greater than about 25 $\mu$m, and knife-edge or notched-bar coating techniques are suitable only for wet coating thicknesses greater than about 75 $\mu$m. Spin coating onto microstructure surfaces, i.e., surfaces having structures in the size range of less than about 100 $\mu$m, typically results in coating defects and non-uniform coating thicknesses due to the interaction between the microstructure and the radial fluid flow profile. Spray coating results in local non-uniformities in very small thickness applications, and the overspray interferes with the selective coating process. Conventional gravure roll coating is generally not applicable in selective coating patterns, although small wet thickness layers are attainable. Screen coating can generate patterned layers, but screen registration with the microstructure is critical, and this technique is not generally applicable to wet layers under 25 $\mu$m thick.

It is often desirable to be able to apply a very thin, uniform coating to the lower surface of a microstructure bilevel substrate, e.g., between the ridges on the substrate. In a liquid crystal display (LCD), it is desirable to apply an alignment layer to the LCD panel in the areas between adjacent ridges on the LCD panel. The alignment layer induces molecular orientation in the liquid crystal which results in the necessary electro-optic response of the device. A uniform layer thickness of less than about 0.2 $\mu$m, and preferably about 0.1 $\mu$m, is required for uniformity of optical performance over the entire area of the LCD.

SUMMARY OF THE INVENTION

Accordingly, the present invention provides a method for applying a thin, highly uniform coating to the lower level of a bilevel substrate. The method includes the following steps: A liquid coating, such as a material useful as an alignment layer, is applied over a bilevel substrate, such as an LCD panel. The bilevel substrate may have flat-topped ribs or other protrusions so long as the tops of the protrusions are coplanar. Next, a leveling device, such as a doctor blade, is moved across the upper surface of the bilevel substrate so that the liquid coating is removed from the upper surface but remains on the lower surface. Finally, the liquid coating is hardened and shrunk, e.g., by drying or curing, resulting in a highly uniform hardened coating, such as an alignment layer, on the lower surface of the bilevel substrate.

DETAILED DESCRIPTION

Figure 1:
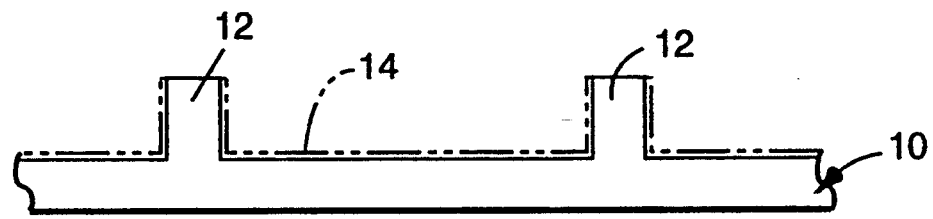
FIG. 1 is a schematic side view of a bilevel substrate according to the present invention.

A schematic side view of bilevel substrate 10 according to the present invention is shown in FIG. 1. Substrate 10 has a plurality of rectangular, flat-topped ridges (or ribs) 12. The tops of ridges 12 are coplanar and define the upper surface of bilevel substrate 10. The areas between ridges 12 define the lower surface of bilevel substrate 10. An optional coating or coatings 14 may be applied to substrate 10 between ridges 12 (and-/or on the tops of the ridges) if desired.

Figure 2:
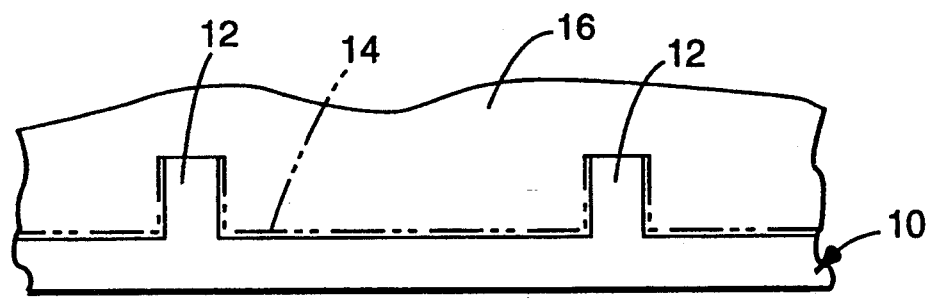
FIG. 2 is a schematic side view of the bilevel substrate of FIG. 1 covered with a coating according to the present invention.

The method of the present invention is begun by applying a liquid coating 16 over substrate 10, so that ridges 12 and the areas between the ridges are completely covered by the coating, as shown in FIG. 2. Coating 16 may be applied by gravure roll, doctor blade, knife edge, or other conventional methods.

Figure 3:
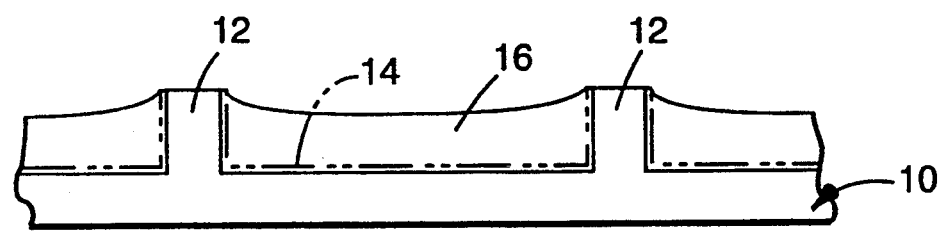
FIG. 3 is a schematic side view of the bilevel substrate of FIG. 2 after the coating has been removed frown the tops of the ridges according to the present invention.

Next, a leveling device, such as a doctor blade (not shown), is moved across substrate 10 with sufficient force to provide contact with the tops of ridges 12, while leaving coating 16 between the ridges, as shown in FIG. 3. The height of ridges 12 determines the wet thickness of coating 16 on substrate 10 between ridges 12, and the surface tension of the wet coating forms a slight meniscus in the coating between the ridges.

Figure 4:
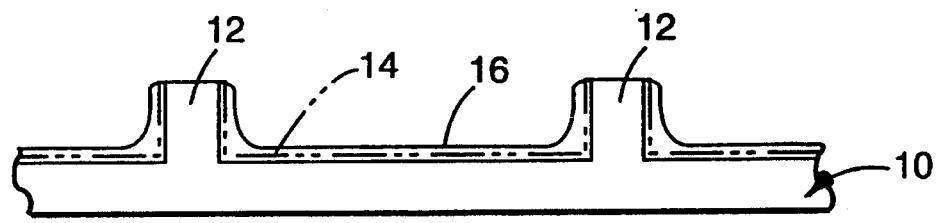
FIG. 4 is a schematic side view of the bilevel substrate of FIG. 3 after the coating has been hardened and shrunk according to the present invention.

Finally, the thickness of coating 16 is reduced by drying or curing, as shown in FIG. 4. If the initial wet coating 16 has a low percent solids, then solvent removal reduces the coating thickness. If the initial wet coating 16 has a high percent solids, then shrinkage can occur during curing to reduce the coating thickness.

Substrate 10 may be made of any flexible or rigid material including plastic, glass, metal, or ceramic. Substrate 10 may also be one of a pair of panels that comprise a liquid crystal display. Ridges 12 preferably have a height within the range of from 1 to 100 $\mu$m, and more preferably 1 to 10 $\mu$m, a width in the range of from 1 $\mu$m to 1 mm, and more preferably 1 to 100 $\mu$m, and a spacing within the range of from 1 $\mu$m to 10 mm, and more preferably 100 $\mu$m to 1 mm.

Optional coating or coatings 14 may be transparent and electrically conductive, such as a single layer of indium tin oxide (ITO), and should preferably have a dried thickness within the range of from about 1 nm to 1 $\mu$m. In the alternative, coating 14 may be a surface modifying layer, such as a primer or release layer if coating 16 is a transfer adhesive.

Coating 16 may be any material that can be coated as a liquid, including materials useful for alignment layers in LCD's, such as polyimides and nylons. For example, coating 16 could be a slurry or an adhesive, such as a transfer adhesive. Coating 16 should preferably be within the range of from about 1 to 25 percent solids, and more preferably from about 1 to 10 percent solids, if the wet coating thickness is to be reduced to the dry coating thickness through removal of the excess solvent. If coating 16 undergoes shrinkage during a curing process, a higher percent solids material may be used, even up to 100% solids. Coating 16 should be applied at a thickness of at least as great as the height of ridges 12, but should preferably be applied over the ridges as well. Hardened coating 16 preferably has a thickness less than 10 μm, more preferably less than 1 μm, still more preferably less than 0.1 μm, and most preferably about 0.05 μm.

Coating 16 may be removed from the tops of ridges 12 by moving the leveling device along the length of the ridges. Preferred leveling devices include flexible or rigid blades, preferably made of plastic, elastomers, or metal.

Hardened coating 16 preferably has a thickness of less than about 25% of the wet thickness, and more preferably less than 10% of the wet thickness. The uniformity of thickness of coating 16 should not vary by more than 10%.

Although the present invention has been described with reference to preferred embodiments, workers skilled in the an will recognize that changes may be made in form and detail without departing from the spirit and scope of this invention. For example, although this invention has been described with reference to a ridged substrate, the present invention may be applied to any bilevel substrate having a substantially planar upper surface. While the ridges have been described as rectangular in shape and parallel to each other, they can have sloped or curved side walls and need not be parallel to each other. Although the bilevel substrate has been described as a ridged-substrate, the bilevel substrate can instead comprise a plurality of protrusions, the tops of which are coplanar.

The present invention will now be further illustrated by the following nonlimiting example. All measurements are approximate.

EXAMPLE

A bilevel flexible polyolefin substrate having a plurality of parallel ridges of height 4.5 μm, width 30 μm, and spacing 290 μm was coated to completely cover the ridges and spacing between the ridges with a 2% solids solution of polyimide alignment layer material. A flexible plastic leveling blade was then used to remove the excess coating solution from the ridge tops. The coating was then thermally dried at 120° C. for one hour. The cured coating thickness was calculated to be 0.09 μm (4.5 μm×0.02) and the thickness variation was estimated to be less than 10%.

We claim:

1. A method of applying a coating to the lower surface of a bilevel substrate, comprising the steps of:
   applying a liquid coating over a liquid crystal display panel comprised of a bilevel substrate having a lower surface and an upper surface comprised of a plurality of protrusions, the tops of which are coplanar;
   moving a leveling device across the upper surface of the bilevel substrate, whereby the liquid coating on the upper surface of the bilevel substrate is removed while the liquid coating on the lower surface is not; and
   hardening and shrinking the remaining coating by drying or curing it, thereby obtaining a hardened coating on the lower surface of the bilevel substrate.

2. The method of claim 1, wherein the protrusions comprise parallel, flat-topped ridges.

3. The method of claim 2, wherein the step of moving the leveling device further comprises moving the leveling device along the length of the ridges.

4. The method of claim 1, wherein the thickness of the hardened coating is less than 25% of the thickness of the liquid coating.

5. The method of claim 1, wherein the thickness of the hardened coating is less than 10% of the thickness of the liquid coating.

6. The method of claim 1, wherein the coating is an alignment layer.

7. The method of claim 1, wherein the coating is a transfer adhesive.

8. The method of claim 7, wherein the transfer adhesive has a hardened thickness of less than 0.1 μm.

9. A method of applying an alignment layer to a liquid crystal display panel, comprising the steps of:
   applying a liquid coating suitable for use as an alignment layer in a liquid crystal display over a liquid crystal display panel having a plurality of flat-topped ridges, the panel having a transparent, electrically conductive coating provided between the ridges;
   moving a leveling device across the tops of the ridges of the panel, whereby the liquid coating on the tops of the ridges is removed while the liquid coating between the ridges is not; and
   hardening and shrinking the remaining coating by drying or curing it, thereby obtaining an alignment layer on the liquid crystal display panel between the ridges.

10. The method of claim 9, wherein the distance between adjacent ridges is less than about 1 mm and the height of the ridges is less than about 10 μm.

11. The method of claim 9, wherein the ridges are parallel to each other and wherein the step of moving the leveling device further comprises moving the device along the length of the ridges.

12. The method of claim 9, wherein the percent solids of the liquid coating is less than about 10%.

13. The method of claim 9, wherein the alignment layer is less than about 0.2 μm thick.

14. The method of claim 9, wherein the thickness of the alignment layer varies by less than 10% across the panel.

* * * * *